Jan. 7, 1936.   F. W. CALDWELL ET AL   2,026,814
PROPELLER CONTROL MECHANISM
Filed June 6, 1934   2 Sheets-Sheet 1
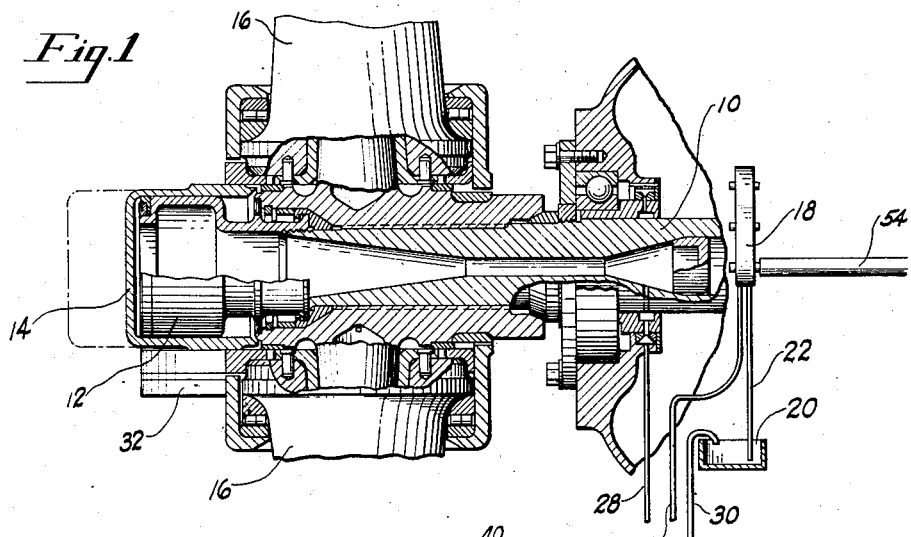
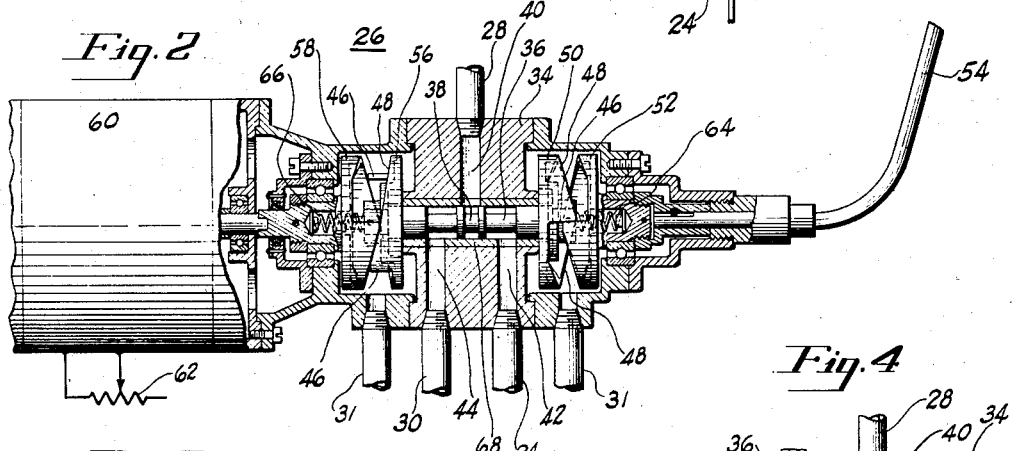
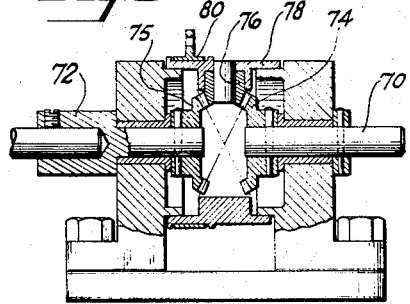
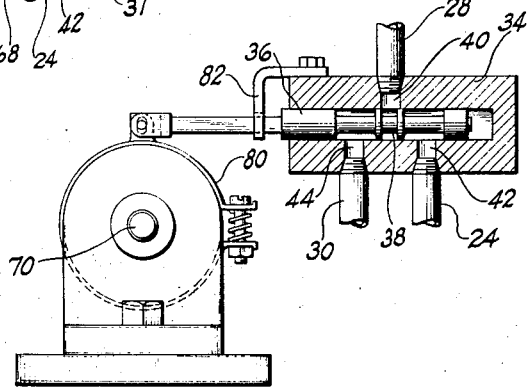
INVENTORS
Frank W. Caldwell
and Erle Martin
BY Harris G. Luther
ATTORNEY

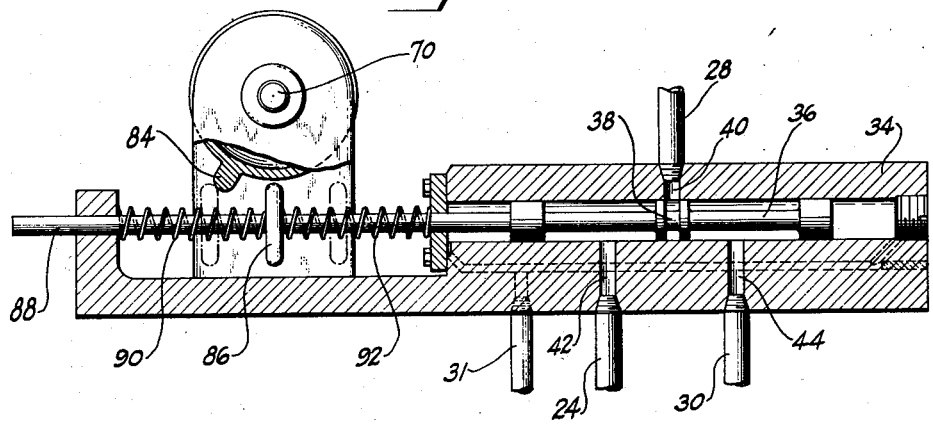
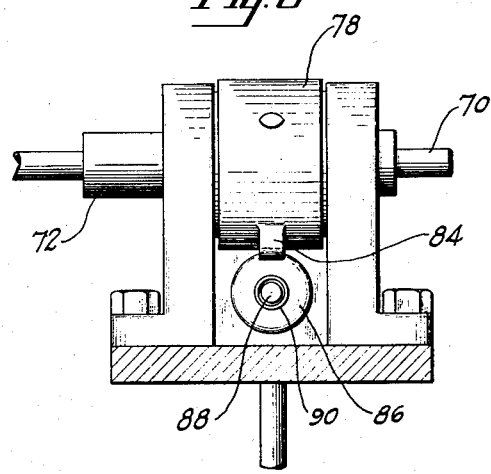

Patented Jan. 7, 1936

2,026,814

UNITED STATES PATENT OFFICE 2,026,814

PROPELLER CONTROL MECHANISM

Frank W. Caldwell, West Hartford, and Erle Martin, Hartford, Conn., assignors, by mesne assignments, to United Aircraft Corporation, a corporation of Delaware Application June 6, 1934, Serial No. 729,214

21 Claims. (Cl. 170—162)

This invention relates to propeller control mechanism and more particularly to a speed control mechanism.

This invention finds particular use as a control mechanism for controllable pitch propellers and especially as a means for maintaining constant speed of the propeller and its driving mechanism by variations in the pitch of the propeller.

In connection with the operation of airplanes, the desirability of having means by which the speed of the engine, especially an internal combustion engine, could be maintained constant has long been known. In the past, however, no such device has ever reached a stage of development where it could be put to any practical use, being either too heavy, subject to hunting, or impractical for various other reasons.

Among the advantages to be obtained from maintaining a constant engine speed might be mentioned the improvement in "take-off" characteristics. In the engine-propeller combination, using a fixed pitch propeller, a propeller having a high pitch, adapted to give it reasonable efficiency in cruising, requires so much torque to turn it at the slow airplane speed during take-off that the engine speed and consequently its power is held below the available permissible power. If a controllable propeller with two settings is used, the take-off characteristics are much improved, but the engine is opperating at its highest permissible speed and full throttle opening during the take-off at only one airplane speed. With the constant speed propeller, however, the throttle may be opened wide and the propeller will absorb all the power of the engine, and also maintain a constant predetermined engine speed so that full power is available during the entire take-off. There are, of course, many other conditions of flight in which the constant speed control mechanism is of particular advantage.

One of the objects of the present invention is to provide a practical control mechanism.

Another object of the invention is to provide speed responsive means for controlling the pitch of a propeller.

Other objects and advantages will be apparent from the attached specification and the accompanying drawings which illustrate what is now considered the preferred embodiment.

Fig. 1 is a view partly in section of the forward portion of an engine and of part of a controllable pitch propeller.

Fig. 2 is a view partly in section of the control mechanism.

Fig. 3 is a view partly in section of a modified control mechanism.

Fig. 4 is an end view partly in section of the modified control mechanism.

Fig. 5 is a view partly in section of another modification, and

Fig. 6 is an end view thereof.

The control mechanism is shown in connection with an engine having a hollow propeller shaft 10.

A propeller having a piston 12 and a cylinder 14 adapted to be operated by fluid led through the hollow propeller shaft to change the pitch of the propeller is mounted on the forward portion of said shaft. By means of a connection (not shown) movement of the cylinder relative to the piston 12 is transformed into opposite rotary movements of the propeller blades 16 to thereby change the pitch of the propeller blades 16 and thereby change the pitch of the propeller. This propeller has been fully described and illustrated in the co-pending application 656,533 of Frank W. Caldwell, one of the joint applicants in this application, and further explanation here is considered unnecessary. It should be understood, however, that this invention is not limited to use with this particular propeller.

A pump 18 is shown diagrammatically as driven by the engine which drives the propeller shaft 10. This pump may be the oil pump ordinarily used for supplying lubricating oil to the engine or it may be any other source of fluid pressure. As shown, the pump is adapted to take oil from a sump or supply 20 by means of an intake line 22 and deliver it under pressure through the line 24. This oil, after having passed through the control valve, which is designated generally as 26, is led through pipe 28 to the propeller to, in the present instance, reduce the pitch of the propeller. In order to increase the pitch of the propeller, the oil is allowed to drain back through the pipes 28 and out of the pipes 30 to the sump or storage tank 20. In the modification herein described, centrifugal weights 32, connected with the propeller blades 16, act to turn them to their high pitch position and also move the cylinder 14 to force the oil out.

One form of control mechanism, indicated generally as 26, and illustrated in Fig. 2 comprises a valve body 34 having a rotatably and axially slidable piston 36 therein. This piston has a portion 38 adapted upon axial movement of the piston to either close the port 40 entirely or connect it with either port 42 or port 44 to thereby either prevent passage of any fluid to or from the propeller operating mechanism, or to connect the propeller operating mechanism with either a source of pressure or with the drain.

In order to move this piston 36 axially in response to any variations of engine speed from a predetermined selected speed, face cams are secured to the ends of said piston and concentric therewith, the cams being similar and located one at each end of the piston. In the modification shown in Fig. 2, these cams are provided with two lobes. Each cam is provided with a face 46 extending substantially parallel to the axis of the piston and with a face 48 extending from the outermost portion of the face 46 in a gradual slope to a point adjacent the innermost portion of the next face 46.

These cams co-act with similar adjacent cams arranged axially thereof. The cam on the right hand end of the piston designated as 50 co-acts with a cam 52 which is connected by means of a flexible shaft 54 to some rotating portion of the engine so as to rotate either at engine speed or some fixed multiple thereof. On the left hand end of the piston, as seen in Fig. 2, the cam designated as 56 co-acts with a similar cam, designated as 58, which, in turn, is adapted to be driven in the same direction as cam 52 by a constant speed motor 60 which may be set to operate at any desired speed by means of the rheostat 62. Springs 64 and 66 are arranged at the ends of the piston 36 to oppose each other and to hold the piston in a substantially central position, unless actuated by one or the other of the aforementioned cams. Drains 31 are provided to conduct oil that may seep into the cam housings back to the sump or supply 20.

The operation of these cams is as follows. Assuming that the electric motor and the engine are operating at the same speed and that the faces 46 of cams 50 and 52 are in contact so that cam 52 is momentarily driving cam 50, as shown in Fig. 2 and that the faces 46 of the cams 56 and 58 are also in contact so that cam 58 is also theoretically momentarily driving cam 56, the springs 64 and 66 will hold the piston substantially central, part 38 of the piston 36 will cover the port 40 and no oil will flow either to or from the propeller through pipe 28 and port 40. The cams will, however, cause rotation of the piston in its guide 68 at the same speed as the motor and engine.

If, now, the speed of the engine should increase or tend to increase, cam 52 would then continue to drive the piston through the cam 50 while the cam 58 would continue to rotate at a slower speed. Cam 56 would then rotate relative to cam 58 and the sloping surfaces 48 of cams 56 and 58 would come in contact, as shown in Fig. 2 and force the piston toward the right, thus connecting port 40 with port 44 and thereby allowing oil to drain from the propeller pitch changing mechanism which, in turn, would cause an increase in the pitch of the propeller and a reduction in the engine speed.

If the engine speed were less than the speed of the electric motor, the exact reverse of the above described operation would take place and the motor would rotate the piston through cams 58 and 56 and the sloping surfaces 48 of cams 50 and 52 would come in contact and shift the piston towards the left as seen in Fig. 2, thereby connecting port 40 with port 42, and allowing oil under pressure to enter the pitch actuating mechanism and reduce the pitch of the propeller, and thereby increase the speed of the engine.

It should be noted that because of the inertia of the motor armature which always tends to rotate at the same speed, any slight acceleration of the engine will immediately move the valve and start the cycle, tending to reduce or overcome that acceleration even before any material increase in speed has taken place. Furthermore, because the piston is always rotating in a bath of oil, the sliding friction is greatly reduced. The control mechanism is, therefore, very sensitive and maintains the engine speed within very small limits.

The cams and the travel of the piston may be arranged so that in case of excessive differences of speed between cams 52 and 58, the cams mounted on the piston may be allowed to rotate relative to the slower moving of the cams 52 and 58, clearance being provided so that the high points of the co-acting cams may pass, which will prevent the engine from driving the electric motor and the electric motor from attempting to drive the engine through these cams. It has been found, however, that better operation is obtained by adjusting the cams so that the high points will not pass and so that upon excessive differences in speed from the predetermined normal motor speed, the engine will drive the motor, or the motor will attempt to drive the engine.

In this preferred embodiment especially, and to a certain extent in the embodiment in which the cams pass each other, the inertia of the motor armature has a particular value in preventing hunting. If, for instance, the engine has, through some violent maneuver, or otherwise, attained a speed higher than that for which the constant speed motor is regulated, the motor speed is also increased to that speed because it must rotate at the speed of the engine driven shaft 54. The valve 38 is of course then wide open, connecting the propeller with the drain, to increase the pitch of the propeller and reduce the engine speed. When the propeller pitch has increased sufficiently so that it tends to reduce the engine speed, the inertia of the motor armature momentarily tends to continue to rotate the armature at the previous increased speed so that as the engine speed decreases the valve 38 is closed and stops any further increase in the propeller pitch before the engine speed has been reduced to the predetermined speed for which the constant speed motor has been set.

This action prevents overshooting of the speed reduction and tends to bring the engine speed down gradually to the predetermined speed and thus prevents hunting.

If the propeller pitch at which the valve 38 closed is not sufficient to bring the engine back to the predetermined speed, then as the constant speed tendencies of the motor overcome its inertia and slow it down to the predetermined speed the valve 38 will be again opened and the propeller pitch further increased. By correctly proportioning the ratio between the constant speed tendencies of the motor and its inertia, making its inertia large enough so that the motor armature will change speed slower than the engine in violent or sudden maneuvers or when the propeller is changing pitch at its maximum rate, it is possible to reach a condition in which practically no hunting takes place even in the most violent maneuvers.

The effect of this armature inertia is, of course, the same when the engine speed is below the predetermined value except that the inertia tends to continue the rotation of the motor armature at the slower speed long enough to close the valve and stop further pitch reduction before the engine speed has increased to the predetermined value.

It is possible that under some conditions the valve 38 may not only be closed to prevent any further propeller pitch change while the engine speed is still above the predetermined value but the valve 38 may even be opened in the other direction to decrease the propeller pitch slightly and thus slow up the rapid reduction in engine speed and thus act as an additional means for preventing overshooting and hunting.

In Figs. 3 and 4, a modification is shown in which a differential gearing arrangement is provided to operate the oil valve. In this modification, shaft 70 may be driven from the engine by a flexible shaft, such as 54 and the shaft 72 may be driven by a constant speed electric motor such as 60 in a manner similar to that disclosed in Fig. 2 except that the shafts 70 and 72 will operate in opposite directions instead of in the same direction. A gear 74, secured to shaft 70 meshes with a gear 76 rotatably mounted in a support 78 which, in turn, is adapted to rotate about the axis of the shafts 70 and 72. A gear 75 is secured to shaft 72 and also meshes with the gear 76. A friction band 80 is secured around the support 78 and is connected with the piston valve 36 so that movement of the support 78 is transmitted to the valve 36 to cause axial movement thereof to the extent of travel of the piston 36. A stop 82 limits movement of the valve in one direction and the valve body 34 limits movement in the other direction. Further movement of the support 78 causes it to rotate inside of the friction band 80. In the operation of this modification, when shafts 70 and 72 are rotating at the same speed, but in opposite directions, gear 76 will rotate about its axis, but no movement will be imparted to its support 78. When, however, the speed of either shaft 70 or 72 is increased, the gear 76 will then, in addition, tend to rotate around the axis of the slower moving gear and thereby cause rotation of the support 78 which, in turn, is transmitted to the piston valve to cause the engine speed to return to the normal speed of the motor in the same manner as described in connection with the modification shown in Fig. 2.

In Figs. 5 and 6 a modification is shown similar to the device shown in Figs. 3 and 4 with the exception of the connection of the valve to its operating mechanism. A lug 84 is formed on the support 78 and is adapted to strike the flange 86 formed on the extension 88 of the piston 36. A pair of springs 90 and 92 serve to maintain the valve in neutral position when it is not actuated by the lug 84.

Assuming that the engine operated shaft 70 turns in a clockwise direction as viewed in Fig. 5 and is turning faster than the shaft 72 driven by the constant speed motor, a clockwise movement, as viewed in Fig. 5, will then be imparted to support 78 and the lug 84. At each rotation the lug 84 will move the flange 86 to the left hand position indicated by dotted lines in Fig. 5 and will connect the propeller actuating mechanism with the drain through port 44 and pipe 30 to increase the pitch of the propeller and reduce the engine speed.

If the shaft 70 is moving slower than the shaft 72 the support 78 and the lug 84 will turn in a counter-clockwise direction as seen in Fig. 5 and will move the flange 86 to the right hand dotted line position and thereby move the valve 38 to connect the propeller actuating mechanism with the source of pressure to reduce the pitch of the propeller and increase the engine speed.

If the engine speed is much greater or smaller than the predetermined speed the lug 84 will pass the flange 86 quite rapidly and will hold the valve open for only a short time. The propeller pitch will, however, be changed slightly each time the lug 84 passes. By allowing the valve to remain in its neutral position during the major portion of the time, the propeller pitch is gradually changed and is changed slower as the engine speed nears the predetermined speed so that overshooting and hunting is thereby avoided.

It is to be understood that, although I have described this device in connection with a constant speed electric motor, any other source of constant speed may be used, if desired.

Although I have shown this control device in conjunction with a specific hydraulic controllable pitch propeller, it is to be understood that it can be used with other types of controllable pitch propellers. It will also be understood that the invention can be otherwise embodied and that the drawings are to be construed as defining or limiting the scope of the invention, but as illustrative only. It is, therefore, to be understood that the invention is not limited to the specific embodiment herein described, but may be used in other ways and various changes may be made therein without departing from the spirit and scope of the invention, as defined by the following claims.

What we claim is:

1. Means for controlling the speed of an engine by changing the pitch of a propeller driven thereby comprising, in combination, means driven by the engine, means driven at a constant speed and means actuated by, and responsive to a difference in the speeds of, said driven means for changing the pitch of the propeller.

2. In combination, an engine, a propeller for absorbing the power of said engine and means for changing the pitch of said propeller, means driven at a constant speed, means driven from the engine and propeller pitch control mechanism associated with said driven means and operable responsive to any differences of speed of said driven means to control said pitch changing means to change the pitch of said propeller.

3. In combination, an engine, a propeller for absorbing the power of said engine and means for changing the pitch of said propeller, means driven at a constant speed, means driven from the engine and propeller pitch control mechanism associated with said driven means and operable responsive to an increase in the speed of said engine driven means over the speed of the means driven at constant speed to increase the pitch of said propeller.

4. In combination, a device rotating at a constant speed, another device rotating at a fixed ratio of the speed of mechanism having a variable speed, a controllable pitch propeller driven by said mechanism and adapted to vary the speed of said mechanism, means for changing the pitch of said propeller to vary the amount of power absorbed thereby and thus vary the speed of said mechanism, a valve for controlling said pitch changing means, means between said devices and operable responsive to any difference in speed of said devices for operating said valve.

5. In combination, an engine adapted to be rotated at various speeds, a controllable pitch propeller driven by said engine, means for changing the pitch of said propeller to change the speed of said engine, a valve for controlling said pitch changing means, a device having an appreciable inertia rotating at a constant speed, another device associated with said first device and rotating at a fixed ratio of the speed of said engine, means between said devices and operable responsive to any difference in speed of said devices for operating said valve, the inertia of said constant speed device adapted to maintain its speed substantially unchanged during normal operation of said means.

6. Valve actuating mechanism comprising a pair of bevel gears rotatably and co-axially mounted, a third bevel gear meshing with both the first mentioned gears and adapted to rotate about its own axis, said third gear mounted in a support adapted to rotate about an axis co-axial with said first mentioned gears, a friction band around said support and connected with a valve, means for rotating one of said first mentioned gears at a constant speed, means for driving said second gear at a variable speed whereby said valve is operated by the difference in speed.

7. In combination, a rotating body, means for maintaining the speed of said rotating body substantially constant, said means comprising, a power absorbing device driven by said rotating body, means for changing the speed of said rotating body by changing the power absorbing characteristics of said power absorbing device, means driven by said rotating body, means driven at a substantially constant predetermined speed, control means, for controlling the power absorbing characteristics of said power absorbing device, located between said driven means and adapted to be driven by one or the other of said driven means according as the speed of said rotating body is to be increased or decreased.

8. A valve comprising, in combination, a body having a rotatable and axially slidable piston therein, ports adapted to be covered and uncovered by axial movement of said piston, cams secured at each end of said piston, other cams co-operating with each of said cams, means for rotating said other cams, said other cams adapted to drive the cams on the piston and rotate the piston, and also adapted to move said piston lengthwise when the cams on the piston attempt to drive said other cams.

9. A valve comprising, in combination, a body having a rotatable and axially slidable piston therein, means tending to rotate said valve piston at substantially constant speed, and means adapted to move said valve piston axially when force is applied to said valve piston, tending to rotate it at a different speed.

10. A valve comprising, in combination, a body having a rotatable and axially slidable piston therein, a source of constant speed, means connecting said valve piston with said source and tending to rotate it at said speed, another source of speed, means connecting said valve piston with said other source of speed and tending to rotate it at said speed, said connecting means adapted to slide said valve piston axially responsive to any difference in said speeds.

11. In combination, mechanism subject to speed variation, a body, a control element axially slidable therein, a cam driven at a constant speed associated with said control element, another cam driven by said mechanism and associated with said control element, means connecting said cams and said control element and adapted to actuate the control element responsive to differences in speed of said driven cams.

12. In combination, mechanism subject to speed variations, fluid controlled means for regulating the speed of said mechanism, a body, a piston therein for controlling the flow of fluid to and from said fluid controlled means, a cam driven at a constant speed associated with said piston, another cam driven by said mechanism and associated with said piston, means connecting said cams and said piston and adapted to actuate the piston responsive to differences in speed of said driven cams to regulate the flow of fluid to and from said fluid controlled means.

13. Fluid actuated engine speed control mechanism comprising, in combination, a valve having a piston therein for controlling the flow of fluid to and from said fluid actuated control mechanism, a device rotated at a substantially constant speed and having appreciable inertia associated with said piston, means driven by the engine at a fixed ratio of the engine speed and associated with said piston, elements between said device and said engine driven means adapted to actuate said valve piston upon changes in the speed of the engine before material change in the speed of said device.

14. In an aircraft, an engine, a controllable pitch propeller driven thereby, and means for maintaining constant engine speed under various flight, load and throttle conditions, comprising, in combination, means for controlling the pitch of said propeller, a constant speed electric motor associated with said controlling means, means driven by the engine associated with said controlling means and means actuated by variations in the relative speeds of said electric motor and said engine driven means for actuating said controlling means and changing the pitch of said propeller.

15. In combination, an engine, a fluid operated controllable pitch propeller driven thereby having an actuating cylinder, and means for controlling the propeller pitch to maintain constant engine speed, said means comprising means for controlling the pitch of said propeller by the introduction of fluid into, or the draining of fluid from the actuating cylinder, said control means including a valve for controlling the flow of said fluid, a source of substantially constant speed, means driven by said source of constant speed adapted to actuate said valve in one direction, means driven by the engine adapted to actuate said valve in the opposite direction, said actuating means being effective to actuate said valve responsive to differences in speed between said engine driven means and the means driven by the source of substantially constant speed.

16. In combination, an engine, a fluid operated controllable pitch propeller driven thereby, and means for automatically maintaining the engine speed constant, comprising means for controlling the pitch of said propeller including a valve having a movable part, and adapted to control the transmission of fluid to the propeller, a constant speed electric motor associated with said movable part, means driven by the engine associated with said moving part and means actuated by a difference in the speed of said electric motor and said engine driven means for actuating said movable part and changing the pitch of said propeller.

17. In an aircraft, an engine, a controllable pitch propeller driven thereby, and means for maintaining constant engine speed under various flight, load and throttle conditions, comprising, in combination, means for controlling the pitch of said propeller, means driven at a constant speed associated with said controlling means, means driven at a fixed ratio of the engine speed associated with said controlling means, means actuated by a difference between the speeds of said driven means for actuating said controlling means and changing the pitch of said propeller, and means for regulating the speed of said means driven at a constant speed, and consequently the speed of the engine, to any predetermined value.

18. In combination, in an aircraft, an internal combustion engine, a controllable pitch propeller driven thereby, and means for automatically maintaining the engine speed substantially constant, comprising means for changing the pitch of said propeller, and means for controlling said pitch changing mechanism, means driven at a constant speed and having appreciable inertia associated with said controlling means, means driven at a fixed ratio of the engine speed associated with said controlling means, and means actuated responsive to variations in the speed of said last mentioned driven means for actuating said controlling means for changing the pitch of said propeller without causing any appreciable variation in the speed of said constant speed means.

19. In combination, an engine, a propeller for absorbing the power of said engine, and means for controlling the speed of said engine by controlling the power absorbed by said propeller, said control mechanism comprising means for changing the pitch of said propeller, means for controlling said pitch changing means and means driven at a constant speed adapted to actuate said control mechanism to increase the pitch of said propeller when the engine tends to overspeed.

20. In combination, an engine, means driven by said engine, means driven at a substantially constant speed, means connecting and adapted to be rotated by both said driven means, control means associated with said connecting means and adapted to control the engine speed, said connecting means adapted to actuate said control means in one direction and reduce the speed of the engine when the connecting means is driven by the engine, said connecting means adapted to rotate said constant speed means at the speed of the engine driven means when the engine speed materially exceeds a predetermined value, said constant speed means having a slower rate of return to the predetermined speed than the rate of return of the engine to that speed under the influence of the control mechanism.

21. In combination, an engine, a propeller for absorbing the power of said engine, fluid operated means for changing the pitch of said propeller in one direction, and means operated by centrifugal force for changing the pitch in the other direction, means driven at a constant speed, means driven from the engine, and mechanism adapted to control said pitch changing mechanism associated with said driven means and operable responsive to any difference in the speed of said driven means to change the pitch of said propeller.

FRANK W. CALDWELL.
ERLE MARTIN.